Patented Aug. 25, 1942

2,293,782

UNITED STATES PATENT OFFICE 2,293,782

PREPARATION OF 1-NITRO-2-METHYL-ANTHRAQUINONE

William Robert Waldron, Wilmington, Del., and Lynne Herman Ulich, Penns Grove, N. J., assignors to E. I. du Pont de Nemours & Company, Wilmington, Del., a corporation of Delaware No Drawing. Application March 7, 1939, Serial No. 260,452

5 Claims. (Cl. 260—369)

This invention relates to the preparation of 1-nitro-2-methylanthraquinone. It relates more particularly to an improved process for purifying crude 1-nitro-2-methylanthraquinone which has been prepared by direct nitration of methyl-anthraquinone.

In U. S. 1,540,467 a method of purifying 1-nitro-2-methylanthraquinone is described in which it is alleged that isomeric mono-nitrobodies are removed by an aqueous sodium sulfite wash.

We have found that in the nitration of 2-methylanthraquinone with nitric acid or with "mixed acid," certain oxidation products as well as isomeric and/or dinitrobodies are formed which are not removed with aqueous sodium sulfite solution, and that these compounds, which are apparently hydroxy or carboxy compounds or both, which may also carry nitro groups are alkali soluble and may be removed with relatively strong alkalies such as sodium or potassium hydroxide.

It is therefore an object of this invention to provide a simple, economical, and commercially practical process for purifying 1-nitro-2-methyl-anthraquinone.

It is a further object of the invention to prepare 1-nitro-2-methylanthraquinone in substantially pure form, free from the isomeric and higher nitrobodies, and from those alkali soluble impurities which operate to reduce the ultimate yield of dyestuffs which can be obtained from the pure compound.

We have found that a substantially pure 1-nitro-2-methylanthraquinone may be prepared from the crude compound, obtained by nitration of 2-methylanthraquinone, by heating with an aqueous solution of sodium sulfite and caustic soda having an alkalinity of a pH of 9.5 or above, and then filtering off the insoluble 1-nitro-2-methylanthraquinone.

Where the nitration of the 2-methylanthraquinone has been carried out with reasonable care to assure complete mono-nitration with a minimum amount of dinitration, a single treatment of the crude nitration product with the sulfite-caustic gives a practically pure 1-nitro-2-methyl-anthraquinone, as determined by nitrogen analysis and melting points.

The extent of the removal of the dinitration bodies from the crude 1-nitro-2-methylanthraquinone by the sulfite-caustic treatment is limited by the volume of sulfite-caustic solution employed, so that only about 10 to 15% of dinitrobodies (based on weight of crude) can be removed by a single treatment with 10 parts of a 3% sulfite solution. Therefore if a pure product is to be obtained by a single treatment the crude cake should not contain more than 10–15% of dinitrobodies. Where larger amounts of dinitrobodies are present, they may be removed by additional treatments, or by the use of increased volumes of sulfite.

The alkalinity of a pH of 9.5 or higher has been found to be necessary to effect the desired purification since the weaker alkalies such as soda ash, and sodium bicarbonate do not remove those impurities which we have found to be detrimental in the use of the 1-nitro-2-methylanthraquinone, particularly in the preparation of 2,2'-dimethyl-1,1'-dianthraquinonyl, which is prepared by reduction of the nitro compound to the 1-amino-2-methylanthraquinone, diazotizing and coupling according to the known process.

The amount of caustic soda that must be used is not critical and may be varied, depending upon the amount of impurities present in the crude product. For ordinary crudes, where dinitration is held to a minimum, an alkali concentration of 2% by weight, based on the weight of crude (dry basis) is sufficient.

While the crude 1-nitro-2-methylanthraquinone is preferably treated with the caustic and sulfite in the same solution, it may be treated with aqueous solutions of each separately, and in either order provided the crude product does not contain an undue quantity of dinitrobodies.

The temperatures used for both the sulfite and the caustic treatment may be varied within reasonable limits, without materially affecting the purification. We have found that good results are obtained at temperatures of 90 to 100° C. Lower temperatures may be employed with an increase in the time of treatment.

The process is applicable to the purification of the crude 1-nitro-2-methylanthraquinone obtained by nitration of isolated 2-methylanthraquinone or by the nitration of the crude 2-methylanthraquinone in the sulfuric acid in which it was formed by ring-closing p-toluyl-ortho-benzoic acid.

The following examples are given to illustrate the invention. The parts used are by weight.

*Example 1*

364 parts of crude 1-nitro-2-methylanthraquinone (5.7% N.) (obtained by the nitric acid nitration of 2-methylanthraquinone in sulfuric acid) as a press cake containing 846 parts of water, are milled in 1780 parts of water. To this suspension 75 parts of sodium sulfite (100% basis) and 3.5 parts of caustic soda are added, The purification mass is then heated under agitation to 90 to 95° C. and agitated at this temperature for 5 hours. The volume of the slurry is kept constant during the purification by the addition of water. The purified 1-nitro-2-methylanthraquinone is isolated by filtering and washing alkali free. The resulting product has a nitrogen content of 5.37% and a melting range of 255.0 to 257° C. This product when converted to 2,2'-dimethyl-1,1'-dianthraquinonyl by reduction to the 1-amino-2-methylanthraquinone, diazotization, and condensation of the diazo body to the dianthraquinonyl by treatment with cuprous chloride gives a yield of 49% of 2,2'-dimethyl-1,1'-dianthraquinonyl, whereas the crude 1-nitro-2-methylanthraquinone by identical treatment gives a yield of only 30% 2,2'-dimethyl-1,1'-dianthraquinonyl.

Example 2

364.0 parts of crude 1-nitro-2-methylanthraquinone (5.7% N.) (obtained by the nitric acid nitration of 2-methyl-anthraquinone which in turn has been produced without isolation, by the ring-closure of para toluyl benzoic acid in sulfuric acid) as a milled press cake containing 846 parts of water, are milled in 1780 parts of water. To this suspension 75 parts of sodium sulfite (100% basis) and 36.6 parts of caustic soda are added. The purification is continued and the purified nitro body is isolated as in Example 1. The resulting product has a nitrogen content of 5.26% and a melting range of 254.0 to 257.0° C. It gives a yield of 51% of purified 2,2'-dimethyl-1,1'-dianthraquinonyl as compared to a yield of 30% purified 2,2'-dimethyl-1,1'-dianthraquinonyl from the crude nitro body.

Example 3

364 parts of crude 1-nitro-2-methylanthraquinone (5.7% N.) (obtained by the nitric acid nitration of 2-methyl-anthraquinone dissolved in sulfuric acid) as a press cake containing 846 parts of water, are milled in 1780 parts of water. To this suspension 75 parts of sodium sulfite (100% basis) and 73.2 parts of caustic soda are added. The purification is continued and the purified nitro body isolated as in Example 1. The resulting product has a nitrogen content of 5.25%, and a melting range of 255.0 to 259° C. The yield of purified 2,2'-dimethyl-1,1'-dianthraquinonyl obtained is similar to that of the preceding examples.

Example 4

400 parts of crude 1-nitro-2-methylanthraquinone (5.72% N.) (obtained from the nitric acid nitration of 2-methylanthraquinone dissolved in sulfuric acid) as a press cake containing 950 parts of water, are milled in 1892 parts of water. To this suspension 75 parts of sodium sulfite (100% basis) and 58 parts of caustic soda are added. The purification is continued and the purified nitro body isolated as in Example 1. The resulting product has a nitrogen content of 5.4%, and a melting range of 261.0 to 267.0° C. It gives a yield of 53.0% of purified 2,2'-dimethyl-1,1'-dianthraquinonyl as compared to a yield of 30% of purified 2,2'-dimethyl-1,1'-dianthraquinonyl from the crude nitro body.

Example 5

127 parts of crude 1-nitro-2-methylanthraquinone (5.3% N.) containing an appreciable quantity of unnitrated 2-methylanthraquinone (obtained by the nitric acid nitration of 2-methylanthraquinone dissolved in sulfuric acid) as a press cake containing 296 parts of water, are milled in 586 parts of water. To this suspension 31.4 parts of sodium sulfite (100% basis) and 18.0 parts of caustic soda are added. The purification mass is then heated with agitation to 90 to 95° C. and maintained at this temperature for 5 hours. The volume of the slurry is kept constant during the purification by the addition of water. The purified 1-nitro-2-methylanthraquinone is isolated by filtering and washing alkali free. The resulting product has a nitrogen content of 4.99%, and a melting range of 259 to 270° C. It gives a yield of 51% of purified 2,2'-dimethyl-1,1'-dianthraquinonyl as compared with a yield of 30% of purified 2,2'-dimethyl-1,1'-dianthraquinonyl from the crude nitro body.

As illustrated by the above example, this purification process is applicable for purifying incompletely nitrated 2-methylanthraquinone as well as in the purification of the overnitrated compound, since there are invariably present some impurities which are removed by the sulfite and caustic.

We claim:

1. In the process for preparing substantially pure 1-nitro-2-methylanthraquinone, the step which comprises treating the crude 1-nitro-2-methylanthraquinone with an aqueous solution of caustic alkali and sodium sulfite having an alkalinity of a pH of at least 9.5.

2. In the process for preparing substantially pure 1-nitro-2-methylanthraquinone, the steps which comprise heating crude 1-nitro-2-methylanthraquinone in aqueous suspension with a caustic alkali and with sodium sulfite the solution in which the 1-nitro-2-methylanthraquinone is suspended having an alkalinity of a pH of at least 9.5, isolating the undissolved 1-nitro-2-methylanthraquinone and washing it free from the alkali metal compounds.

3. The process for preparing substantially pure 1-nitro-2-methylanthraquinone which comprises heating an aqueous suspension of the crude 1-nitro-2-methylanthraquinone with sodium sulfite in a caustic alkali concentration of a pH of at least 9.5 at a temperature of from 90 to 100° C., filtering off the undissolved 1-nitro-2-methylanthraquinone and washing it free from occluded alkali metal compounds.

4. In the process for purifying 1-nitro-2-methylanthraquinone in which the crude 1-nitro-2-methylanthraquinone is treated with an aqueous solution of sodium sulfite, the step which comprises removing the alkali soluble impurities by treating the aqueous suspension of 1-nitro-2-methylanthraquinone with a caustic alkali in a concentration of at least a pH of 9.5.

5. In the process for purifying 1-nitro-2-methylanthraquinone, the step which comprises removing the alkali soluble impurities by treating the crude 1-nitro-2-methylanthraquinone with an aqueous solution of caustic alkali having a pH of at least 9.5.

WILLIAM ROBERT WALDRON.
LYNNE HERMAN ULICH.